(12) United States Patent
Zhang et al.

(10) Patent No.: US 12,286,129 B2
(45) Date of Patent: Apr. 29, 2025

(54) SIMULTANEOUS LOCALIZATION AND MAPPING BASED VEHICLE NAVIGATION SYSTEMS ENHANCED BY DRIVER INTERACTIONS

(71) Applicant: GM Global Technology Operations LLC, Detroit, MI (US)

(72) Inventors: Yuan Zhang, Pudong (CN); Wenyuan Qi, Shanghai (CN); Tianxiang Cao, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 261 days.

(21) Appl. No.: 18/156,130

(22) Filed: Jan. 18, 2023

(65) Prior Publication Data

US 2024/0199044 A1    Jun. 20, 2024

(30) Foreign Application Priority Data

Dec. 14, 2022  (CN) .......................... 2022116072841

(51) Int. Cl.
*B60W 50/10*    (2012.01)
*B60W 40/08*    (2012.01)
(Continued)

(52) U.S. Cl.
CPC ............ *B60W 50/10* (2013.01); *B60W 40/08* (2013.01); *B60W 50/14* (2013.01); *B60W 60/001* (2020.02); *B60W 2050/146* (2013.01)

(58) Field of Classification Search
CPC .......... B60W 2050/146; B60W 40/08; B60W 50/10; B60W 50/14; B60W 60/001
See application file for complete search history.

(56) References Cited

U.S. PATENT DOCUMENTS 8,775,006 B2 * 7/2014 Moshchuk ............ B60W 50/08
                                                          701/25
9,141,109 B1 * 9/2015 Kamata ............... B60W 50/023
(Continued)

FOREIGN PATENT DOCUMENTS

CN    109435962 A  *  3/2019
CN    112912278 A  *  6/2021  ............. B60Q 1/085
(Continued)

OTHER PUBLICATIONS

Bresson et al., Simultaneous Localization and Mapping: A Survey of Current Trends in Autonomous Driving, IEEE Transactions on Intelligent Vehicles, vol. 2, No. 3, Sep. 2017.

*Primary Examiner* — Babar Sarwar
(74) *Attorney, Agent, or Firm* — Vivacqua Crane, PLLC (57) ABSTRACT

A method of soliciting an occupant intervention for a simultaneous localization and mapping-based navigation system. A vehicle path plan and a motion control instruction are created and a suspected obstacle in a drive path is identified, wherein the drive path provides a portion of the vehicle path plan. The method further includes providing an indication on a first display that an intervention by an occupant is requested and determining if the occupant is paying attention to the indication on the first display. A system of performing the method includes a controller configured to execute instructions executing the method.

20 Claims, 3 Drawing Sheets

(51) Int. Cl.
*B60W 50/14* (2020.01)
*B60W 60/00* (2020.01)

(56) References Cited

U.S. PATENT DOCUMENTS

| | | | | |
|---|---|---|---|---|
| 11,062,598 | B2* | 7/2021 | Augst | B60K 35/10 |
| 11,332,164 | B2* | 5/2022 | Kaji | B60W 60/0051 |
| 2010/0094541 | A1* | 4/2010 | Gresser | B62D 15/0295 |
| | | | | 348/149 |
| 2015/0070160 | A1* | 3/2015 | Davidsson | B60W 50/14 |
| | | | | 340/457 |
| 2015/0149088 | A1* | 5/2015 | Attard | G01C 21/36 |
| | | | | 701/538 |
| 2015/0332654 | A1* | 11/2015 | Geloen | H04N 9/3197 |
| | | | | 345/697 |
| 2016/0378114 | A1* | 12/2016 | Laur | G05D 1/0061 |
| | | | | 701/23 |
| 2017/0329329 | A1* | 11/2017 | Kamhi | B60W 50/0098 |
| 2017/0355265 | A1* | 12/2017 | Fujita | B60Q 9/008 |
| 2017/0364629 | A1* | 12/2017 | Tarte | B60Q 1/143 |
| 2018/0052470 | A1* | 2/2018 | Kim | B60W 10/04 |
| 2019/0004524 | A1* | 1/2019 | Wang | B60W 60/001 |
| 2019/0061769 | A1* | 2/2019 | Panse | G06V 20/597 |
| 2019/0163262 | A1* | 5/2019 | Alaniz | G02B 27/017 |
| 2019/0204827 | A1* | 7/2019 | Bhalla | G05D 1/0061 |
| 2019/0236386 | A1* | 8/2019 | Yu | B60W 60/0015 |
| 2020/0122746 | A1* | 4/2020 | Sugiura | B60W 60/0053 |
| 2020/0272400 | A1* | 8/2020 | Yoshino | G01C 21/3682 |
| 2022/0111792 | A1* | 4/2022 | Burmistrov | B60W 30/0956 |
| 2022/0258736 | A1* | 8/2022 | Limbacher | B60W 30/162 |
| 2022/0258756 | A1* | 8/2022 | Choi | B60K 35/80 |
| 2023/0008458 | A1* | 1/2023 | Min | B60W 30/18154 |
| 2023/0092515 | A1* | 3/2023 | Cheon | B60W 60/0053 |
| | | | | 701/1 |
| 2023/0242119 | A1* | 8/2023 | Stein | B60W 30/146 |
| | | | | 701/26 |
| 2023/0316919 | A1* | 10/2023 | Hashimoto | B60W 50/14 |
| | | | | 340/435 |
| 2024/0025450 | A1* | 1/2024 | Churay | B60W 30/18163 |
| 2024/0246567 | A1* | 7/2024 | Kume | A61B 5/18 |

FOREIGN PATENT DOCUMENTS

| | | | | |
|---|---|---|---|---|
| CN | 113060131 | A * | 7/2021 | B60W 30/08 |
| CN | 114572112 | A * | 6/2022 | B60R 1/00 |
| CN | 115534987 | A * | 12/2022 | |
| CN | 115755405 | A * | 3/2023 | |
| CN | 116136418 | A * | 5/2023 | |
| CN | 112867650 | B * | 7/2024 | B60W 30/10 |
| DE | 102012212301 | A1 | 1/2013 | |

* cited by examiner

SIMULTANEOUS LOCALIZATION AND MAPPING BASED VEHICLE NAVIGATION SYSTEMS ENHANCED BY DRIVER INTERACTIONS

BACKGROUND

The implementation of various sensors and cameras in vehicles has enabled vehicle navigation using simultaneous localization and mapping, allowing a vehicle to simultaneously create a map and localize in the map. The software and process rely upon the use of the sensors and cameras in combination with various algorithms to perform mapping and localization. In performing mapping functions, the algorithms identify various landmarks within the vehicle's environment. Landmarks may include lane lines, traffic lights, stop signs, other vehicles, and objects on or proximate to the road. Localization and orientation are then performed based on the vehicle's position relative to the landmarks. Simultaneous localization and mapping enable the creation of relatively high-definition maps including various features, such as lane geometry, traffic signs, intersections, etc. Further, maps can be created using simultaneous location and mapping in locations where maps do not already exist. The maps may then be used in autonomous driving and navigation.

Thus, while simultaneous localization and mapping is effective, room remains for improvement in providing navigations systems including simultaneous localization and mapping.

SUMMARY

According to several aspects, the present disclosure relates to a method of soliciting an occupant intervention for a simultaneous localization and mapping-based navigation system. The method includes creating a vehicle path plan and a motion control instruction, and identifying a suspected obstacle in a drive path that forms a portion of the vehicle path plan. The method further includes providing an indication on a first display that an intervention by an occupant is requested and determining if the occupant is paying attention to the indication on the first display.

In embodiments of the above, the method includes circumnavigating the suspected obstacle in the drive path without the intervention of the occupant upon determining the occupant is not paying attention to the indication on the first display.

In any of the above embodiments, the method includes displaying augmented reality elements on a second display upon determining the occupant is paying attention to the indication on the first display. In further embodiments, the method includes requesting the occupant to provide an intervention. In further embodiments, the method also includes requesting the occupant to provide a confirmation the suspected obstacle is pertinent to the drive path. In yet further embodiments, the method includes receiving the confirmation from the occupant within a specified time period. In alternative further embodiments, the method includes circumnavigating the suspected obstacle in the drive path without the confirmation of the occupant when the confirmation of the occupant is not received within a specified period of time.

In embodiments of the above, the method further includes providing a notification to the occupant indicating the occupant may interact with the simultaneous localization and mapping-based vehicle navigation system. In addition, the method includes receiving confirmation from the occupant that the occupant has received the notification. In further embodiments, the method includes determining a predefined condition occurred before providing the notification.

According to several aspects, the present disclosure also relates to a system for simultaneous localization and mapping-based navigation in a vehicle. The system includes a controller and a first display connected to the controller. The system also includes a trip monitoring sensor connected to the controller, an occupant input device connected to the controller, and an attention sensor connected to the controller. The controller is configured to execute instructions to perform any of the above aspects relating to the method of soliciting an occupant intervention for a simultaneous localization and mapping-based navigation system. The controller is configured to execute instructions to create a vehicle path plan and a motion control instruction. The controller is further configured to execute instructions to identify a suspected obstacle in a drive path with the trip monitoring sensor, provide an indication on the first display that an intervention by an occupant is requested, and determine if the occupant is paying attention to the indication on the first display using at least one of the attention sensor and the occupant input device.

In embodiments of the above, a second display connected to the controller, wherein the controller is further configured to execute instructions to display augmented reality elements on the second display upon determining the occupant is paying attention to the indication on the first display. In further embodiments, the augmented reality elements includes a superimposed highlight around the suspected obstacle.

In further embodiments of the above, a third display connected to the controller, wherein the controller is further configured to execute instructions to display information to assist the occupant in providing an intervention. In further embodiments, the third display is integrated into an infotainment system.

In any of the above embodiments, the controller is further configured to execute instructions to request the occupant to provide an intervention that the suspected obstacle was correctly identified as an obstacle in the drive path, wherein the intervention is a confirmation. In further embodiments, the intervention is provided with the occupant input device. In additional further embodiments, the controller is further configured to execute instructions to alter the vehicle path and the motion control instruction upon receiving a confirmation from the occupant that the suspected obstacle is an obstacle in the drive path. In any of the previous embodiments, the controller is further configured to execute instructions to circumnavigate the suspected obstacle in the drive path without the confirmation of the occupant when the confirmation of the occupant is not received within a specified period of time.

In any of the above embodiments, the first display is a heads-up display.

According to several aspects, the present disclosure is further directed to a system for simultaneous localization and mapping-based navigation in a vehicle according to any of the above embodiments. The system includes a controller and a first display connected to the controller. The system further includes a trip monitoring sensor connected to the controller and an occupant input device connected to the controller. The system also includes an attention sensor connected to the controller. Further, the system includes a remote system in communication with the controller. The controller is configured to execute the method of soliciting an occupant intervention for a simultaneous localization and mapping-based navigation system according to any of the above-described aspects. The controller is configured to execute instructions to retrieve predefined maps from the remote system for creating a vehicle path and a motion control instruction and create the vehicle path plan and the motion control instruction. The controller is also configured to execute instructions to identify a suspected obstacle in a drive path with the trip monitoring sensor, provide an indication on the first display that an intervention by an occupant is requested, and determine if the occupant is paying attention to the indication on the first display using at least one of the attention sensor and the occupant input device.

BRIEF DESCRIPTION OF DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features.

As used herein, the term "vehicle" is not limited to automobiles. While the present technology is described primarily herein in connection with automobiles, the technology is not limited to automobiles. The concepts can be used in a wide variety of applications, such as in connection with motorcycles, mopeds, locomotives, aircraft, marine craft, and other vehicles, or other automated systems including navigation and mapping functionalities. Applications include, for example, driving navigation, air navigation, marine navigation, robotic navigation, and navigation in enclosed spaces or enclosed geological features, to name a few.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale.

Figure 1:
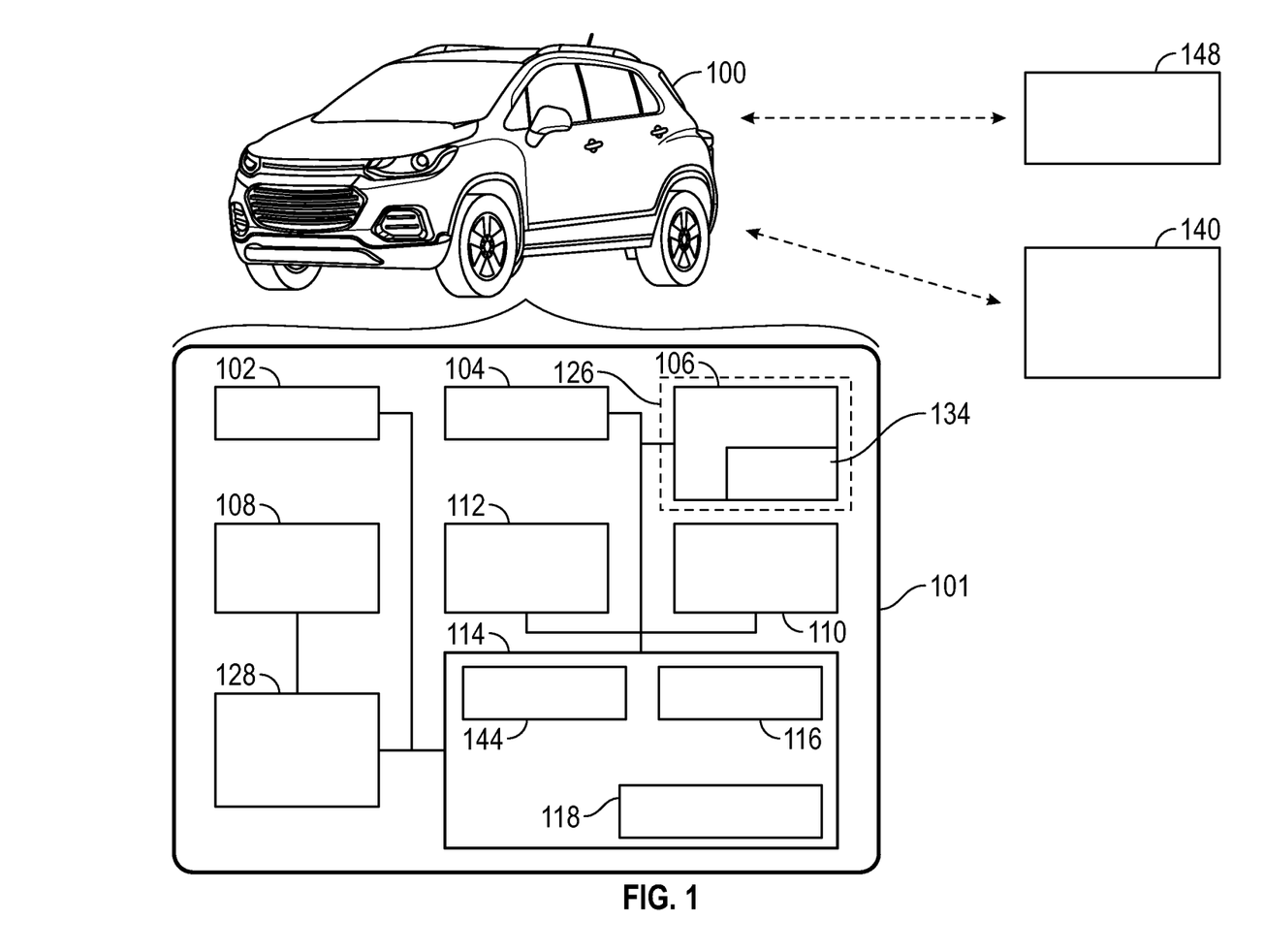
FIG. 1 illustrates an embodiment of a vehicle including a simultaneous localization and mapping system according to various aspects the present disclosure.

The present disclosure is directed to simultaneous localization and mapping (SLAM) based vehicle navigation systems enhanced by driver interactions. FIG. 1 illustrates a vehicle 100 according to aspects of the present disclosure including a simultaneous localization and mapping-based navigation system 101. The simultaneous localization and mapping-based navigation system 101 creates a vehicle path plan and at least one motion control instruction for the vehicle 100 to execute while completing a trip from a start location to a destination in autonomous or semi-autonomous mode. Autonomous is understood as a vehicle 100 that is operated or driven without active physical control by a natural person present in the vehicle. Semi-autonomous is understood as a vehicle 100 that assists the natural person present in a vehicle with various driving tasks, such as parking, traffic jam assistance, lane sensing, adaptive cruise control, etc. The simultaneous localization and mapping-based navigation system 101 includes a number of devices including a number of displays 102, 104, 106, one or more attention sensors 110, occupant input devices 112, and one or more trip monitoring sensors 108. The various devices, i.e., displays 102, 104, 106, one or more attention sensors 110, occupant input devices 112, and one or more trip monitoring sensors 108, are coupled to a controller 114 through one or more wired or wireless connections. The connections provide communication of information in the form of signals, or changes in electrical voltage, to and from the various devices in the SLAM based navigation system 101 and controller 114. The controller 114 is also connected to a computer readable media 116 and a communication system 118 as well as a number of motion control systems 128, including propulsion, steering, and braking systems.

Figure 2:
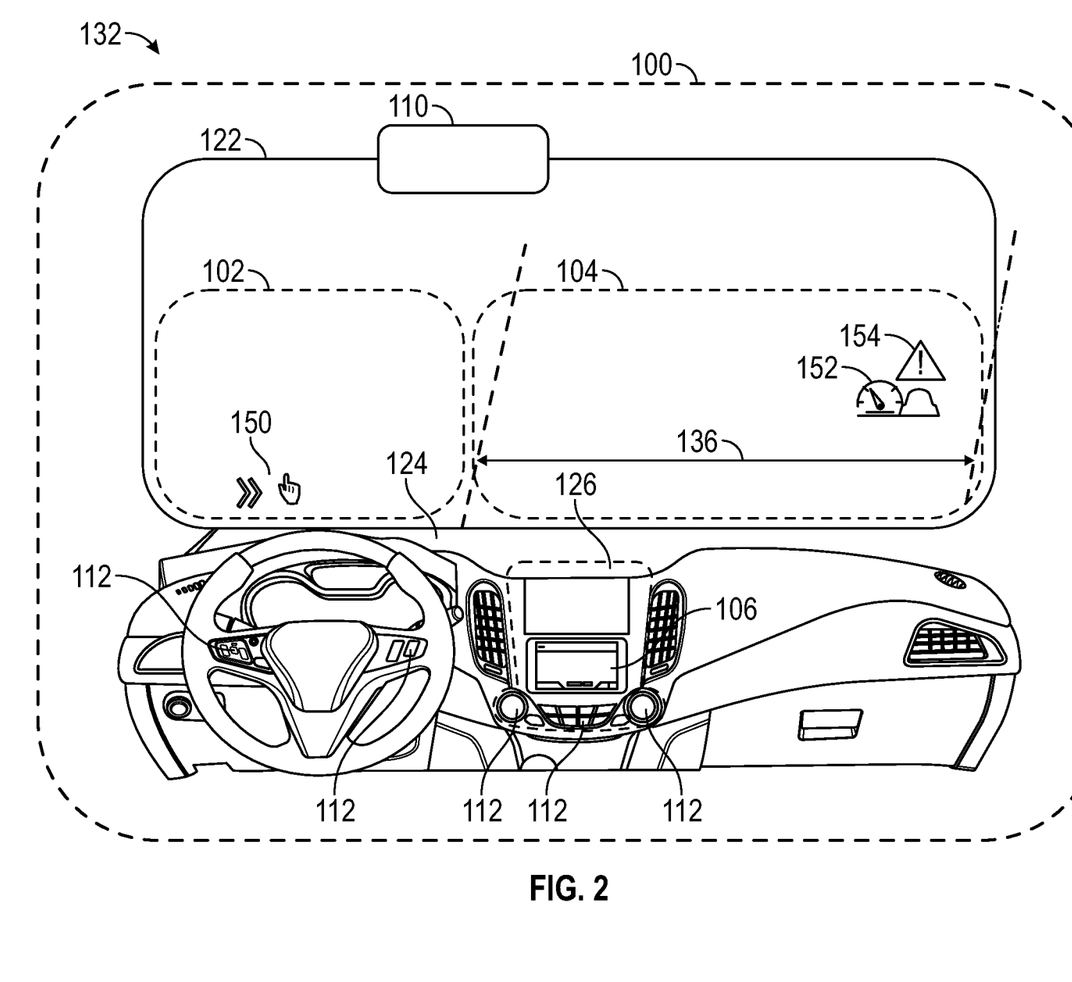
FIG. 2 illustrates an embodiments of various display areas in a vehicle according to various aspects of the present disclosure.

With reference to FIG. 2, one or more of the displays 102, 104 include a heads-up display, which projects data onto the windshield 122 or a display screen mounted on the windshield 122 or near the dashboard 124. In addition, one or more displays 106 may be integrated into the infotainment system 126. In addition, or alternatively, other display screens may be utilized, such as a display located in the dashboard 124. The displays are referenced herein as first display 102, second display 104 and third display 106.

One or more attention sensors 110 is provided, as illustrated in FIG. 2, for determining where a vehicle occupant, such as the driver, is directing their attention. In embodiments, the attention sensors 110 include at least one of a time-of-flight (ToF) sensor and one or more cameras. In embodiments, the cameras capture visible light or infrared irradiation. While an attention sensor 110 is illustrated as being positioned near the top of the windshield 122, the attention sensors 110 may be located in any position that allows measurement of at least one of the occupant's head position, the occupant's eye direction, or the occupant's body. For example, the attention sensors 110 may be positioned on the dashboard 124 or on the roof interior. The controller 114 includes a set of instructions to discern from the data gathered from the attention sensors 110 where the occupant is directing their gaze, a change in the position of the occupant's head, or a gesture by the occupant to determine whether the occupant is looking at one of the first display 102, the second display 104 or the third display 106.

With further reference to FIG. 2, occupant input devices 112 are provided to allow the occupant to utilize, manipulate, and control the SLAM navigation system 101. Occupant input devices 112 include, for example, one or more buttons 130 on the infotainment system 126, and steering wheel 132. The buttons 130 may be push buttons, knobs, switches, selectors, dials, or toggle buttons. The buttons 130 include electromechanical or capacitance sensors, and in further embodiments the buttons 130 provide haptic feedback. Further, the display 106 may be an interactive display including sensors 134 (see FIG. 1), such as capacitance sensors or resistance sensors for detecting touch. In yet further embodiments, the occupant input devices 112 includes microphones, such as a microphone integrated into the infotainment system 126. In yet further embodiments, an occupant may utilize an external communication device 140 for providing input through the communication system 118.

With reference again to FIG. 1, the trip monitoring sensors 108 include provide driving environment perception and include sensors used to monitor various aspects of the vehicle 100 and the environment surrounding the vehicle 100, particularly while the vehicle 100 is in motion. The trip monitoring sensors 108 include, for example, one or more of the following: one or more visible light cameras, one or more infrared radiation cameras, one or more radars, one or more light detection and ranging (lidar) sensors, one or more odometers, one or more ground penetrating radar (GPR) sensors, one or more ground positioning receivers, one or more steering angle sensors, one or more tire pressure sensors, one or more cameras (e.g., optical cameras and/or thermal cameras, such as a rear camera and/or a front camera), one or more gyroscopes, one or more accelerometers, one or more speed sensors, one or more steering angle sensors, one or more ultrasonic sensors, one or more inertial measurement units (IMUs) and/or other sensors. Each sensor 108 is configured to generate a signal that represents information regarding the sensed observable conditions of the exterior environment and/or the interior environment of the vehicle 100.

The controller 114 includes at least one processor 144 and a non-transitory computer readable storage device or media 116. In embodiments, the processor 144 is a custom made or commercially available processor, a central processing unit (CPU), a graphics processing unit (GPU), an auxiliary processor among several processors associated with the controller 114, a semiconductor-based microprocessor (in the form of a microchip or chip set), a macroprocessor, a combination thereof, or generally a device for executing instructions. The computer readable storage device or media 116, in embodiments, includes volatile and nonvolatile storage in read-only memory (ROM), random-access memory (RAM), and keep-alive memory (KAM), for example. KAM is a persistent or non-volatile memory that may be used to store various operating variables while the processor 144 is powered down. The computer-readable storage device or media 116 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the controller 114 in controlling the vehicle 100. The controller 114 is programmed to execute instructions for simultaneous location and mapping based navigation to create a vehicle path plan and at least one motion control instruction as well as execute instructions for a method of determining a desired level of driver intervention and to leverage received driver intervention to facilitate the alteration of a vehicle path plan and at least one motion control instruction created by the SLAM navigation system 101.

The instructions may include one or more separate programs, each of which comprises an ordered listing of executable instructions for implementing logical functions. The instructions, when executed by the processor 144, receive and process signals from the attention sensor 110, occupant input devices 112, and trip monitoring sensors 108, perform logic, calculations, methods and/or algorithms for executing the simultaneous localization and mapping base vehicle navigation, autonomous driving, determining the level of driver interaction, and leveraging driver interaction, when provided, in the SLAM navigation system 101 based on the logic, calculations, methods, and/or algorithms. Although a single controller 114 is shown in FIG. 1, embodiments of the vehicle 100 may include a plurality of controllers 114 that communicate over a suitable communication medium or a combination of communication mediums and that cooperate to process the sensor signals, perform logic, calculations, methods, and/or algorithms, and perform the simultaneous localization and mapping base vehicle navigation, determining a design level of driver interaction, and leveraging driver interaction when provided, based on the logic, calculations, methods, and/or algorithms of the vehicle 100.

The computer readable media 116 stores data for use in autonomous or partial autonomous control of the vehicle 100. The computer readable media 116 is non-transitory and can include one or more storage devices, articles of manufacture, or the like. In embodiments, computer readable media 116 include computer system memory, e.g., RAM (random access memory), ROM (read only memory); semiconductor memory, e.g., EPROM (erasable, programmable ROM), EEPROM (electrically erasable, programmable ROM), flash memory; magnetic or optical disks or tapes; and/or the like. The computer readable media 116 may also include computer-to-computer connections, for example, when data is transferred or provided over a network or another communications connection (either wired, wireless, or a combination thereof). Any combination(s) of the above examples is also included within the scope of the computer-readable media 116.

In various embodiments, the computer readable media 116 stores defined maps of the navigable environment as well as various indications 150 and augmented reality elements 152. In various embodiments, the defined maps are produced using simultaneous localization and mapping previously performed or performed during the trip or performed by other vehicles and may also include maps predefined by and obtained from a remote system 148. For example, the defined maps may be assembled by the remote system 148 and communicated to the vehicle 100 (wirelessly and/or in a wired manner) and stored on the computer readable media 116 in the vehicle 100. The computer readable media 116 may be part of the controller 114, separate from the controller 114, or part of the controller 114 and part of a remote system 148.

The communication system 118 is in communication with the controller 114 and is configured to wirelessly communicate information to and from the remote system 148, such as but not limited to, other vehicles ("V2V" communication), infrastructure ("V2I" communication), remote systems at a remote call center (e.g., ON-STAR by GENERAL MOTORS), and external communication devices 140. In certain embodiments, the communication system 118 is a wireless communication system configured to communicate wirelessly through one or more wireless communication protocols such as through one or more networks utilizing local area networks using IEEE 802.11 a, b, g, n, ac, ax protocols, BLUETOOTH®, cellular networks including 2G, 3G, 4G/LTE, and 5G networks using various communication protocols such as global system for mobile communications (GSM), code division multiple access (CDMA), general packet radio service (GPRS), wideband code division multiple access (W-CDMA), enhanced general packet radio service (E-GPRS), CDMA2000, and universal mobile technology system (UTMS), low power wide-area networks (LPWAN), mobile satellite communications, and combinations thereof. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 118 may include one or more antennas and/or transceivers for receiving and/or transmitting signals, such as cooperative sensing messages (CSMs). The communication system 118 is configured to wirelessly communicate information between the vehicle 100 and another vehicle. Further, the communication system 118 is configured to wirelessly communicate information between the vehicle 100 and infrastructure or other vehicles.

Figure 3:
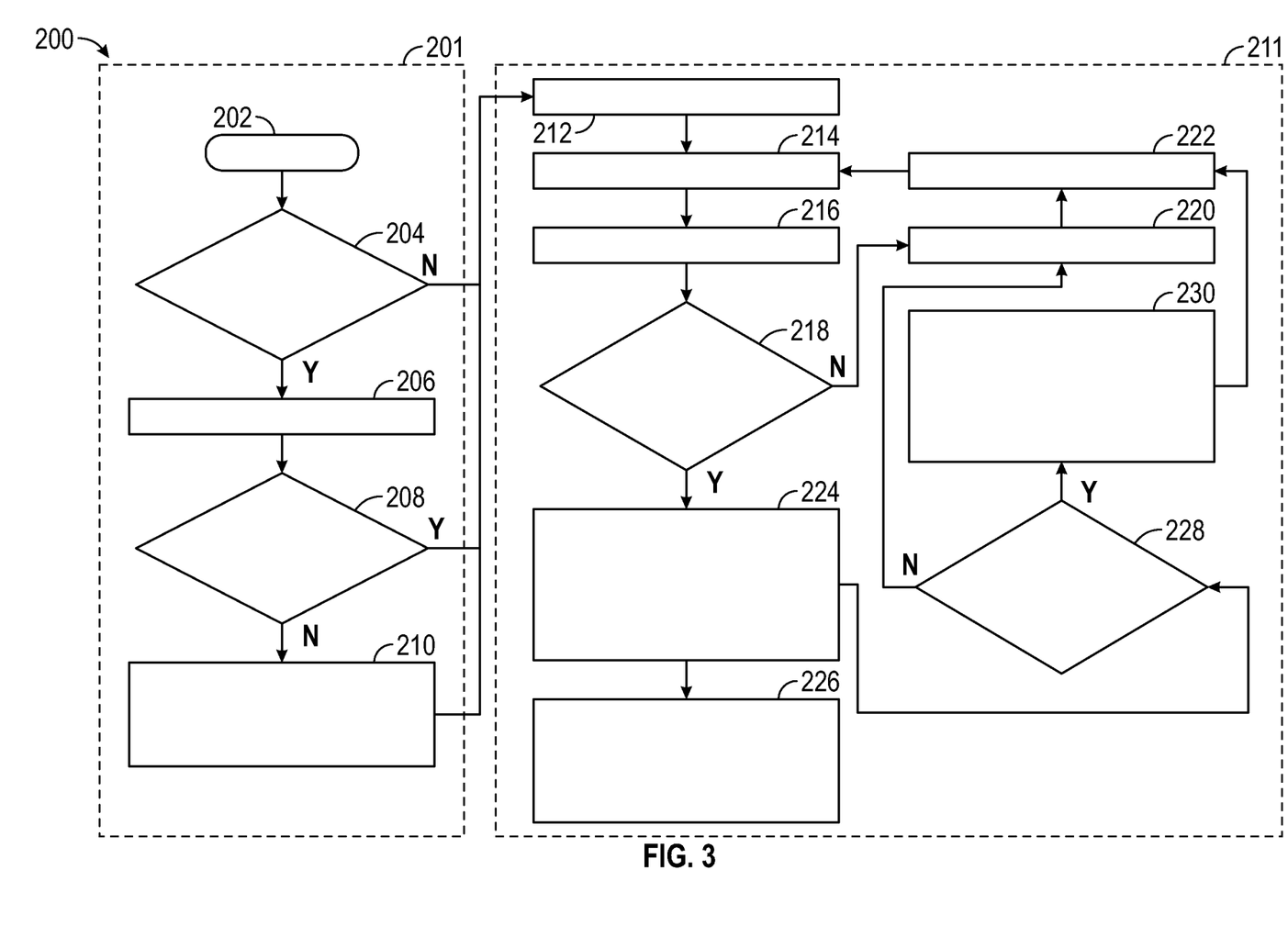
FIG. 3 illustrates a flowchart of driver interaction and display configurations during a mapping session according to various aspects of the present disclosure.

FIG. 3 is a flowchart of a method 200 of determining degree of driver interaction in the simultaneous localization and mapping-based vehicle navigation system 101. The method 200 or parts thereof may be implemented in a computer program product embodied in computer readable media 116 and including instructions usable by the processor 144 of the controller 114 or a remote system 148 across which processing and data storage may take place. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one computer or on multiple computers in communication with one another. It is therefore to be understood that the method 200 may be at least partially performed by any electronic articles and/or devices capable of carrying out instructions corresponding to one or more steps of the method 200.

The controller 114 initiates pre-simultaneous localization and mapping based vehicle navigation activities 201. At block 202 the SLAM based navigation system 101 is started, such as when the vehicle 100 is started or a trip is requested by the occupant. At block 204 the controller 114 determines whether a predefined condition that indicates whether the occupant is using the simultaneous localization and mapping-based vehicle navigation system 101 for the first time has occurred. Such conditions include, for example, the first time the vehicle 100 is started, the vehicle 100 being switched from a demo mode to standard mode after purchase, a new occupant (such as a new driver) entering the vehicle (which may be sensed by the attention sensor 110), etc. When a determination is made by the controller 114 that a predefined condition occurred at block 204, at block 206 a notification is provided to the occupant indicating that the occupant may interact with the simultaneous localization and mapping based vehicle navigation system 101. The notification may also inform the occupant as to how the feature works and how to use the SLAM based navigation system 101, and the various degrees of intervention the driver may elect to perform relative to the simultaneous localization and mapping-based vehicle navigation system 101.

At block 208, a determination is made as to whether the occupant has confirmed receipt of the notification provided at block 206. If receipt has not been confirmed at block 208, then at block 210 the driver is prompted to confirm receipt of the notification that the vehicle 100 is enabled with a simultaneous localization and mapping-based vehicle navigation system 101 and how to utilize the system 101. If receipt has been confirmed at block 208, at block 212 the simultaneous localization and mapping-based vehicle navigation session 211 is initiated by the controller 114. If the predefined condition has not occurred at block 204 and the occupant is aware of the functionalities available in the SLAM navigation system 101, the vehicle 100 may initiate a simultaneous localization and mapping vehicle navigation session 211.

Once the simultaneous localization and mapping-based vehicle navigation session has begun at block 212, the simultaneous localization and mapping based vehicle navigation system 101 maps and localizes the vehicle 100 while the vehicle 100 is in motion and creates a vehicle path and one or more motion control instructions. A vehicle path is understood as the simulated path for the vehicle 100 to traverse to reach a destination. Motion control instructions include instructions executed by the controller 114 for controlling the various movement systems 128 in the vehicle 100, such as the propulsion, steering, and braking systems, that cause the vehicle 100 to navigate the vehicle path in autonomous or semi-autonomous mode.

In embodiments, predefined maps are used to create the vehicle path and one or more motion control instructions. The predefined maps may be stored on a remote system 148 and are retrieved by the controller 114 or created by the vehicle 100 and stored in computer readable media 116 accessible by the controller 114. During the SLAM based navigation session 211, the vehicle 100 may be driven completely autonomously, without occupant input, or in cooperation with an occupant semi-autonomously. In embodiments, complete autonomous driving, without intervention by the occupant, or partial autonomous driving, with limited intervention by the occupant, may be set at the beginning of the SLAM navigation session 211. At block 214 a suspected obstacle 154 illustrated in FIG. 2, is identified by one or more of the trip monitoring sensors 108 and is identified by the navigation system 101 as a suspected obstacle that might impact the drive path. The drive path 136 is understood as the actual path the vehicle 100 traverses based upon the vehicle path determined by the SLAM based navigation system 101. Stated another way, the drive path provides a portion of the vehicle path plan.

At block 216, an indication 150 is provided by the controller 114 on a primary display, such as the first display 102, that intervention from an occupant is requested, such as when a suspected obstacle 154 has been identified that might impact the drive path 136 (see FIG. 2) that forms a portion of the vehicle path. The indication 150 provided by the SLAM based navigation system 101 may also direct the occupant's attention to a second display 104 or a third display 106. It should be appreciated that any of the displays 102, 104, 106 may be the primary display, depending on how the occupant configured the SLAM based navigation system 101 during the pre-SLAM-based navigation activities 201 or during the SLAM based navigation session 211. The indication 150 may include any visual indication to attract attention from an occupant, such as a hazard sign or arrows. In addition, an audible signal may be played by, e.g., the infotainment system 126.

At block 218, one or both of: data detected by the attention sensor 110, such as various images, and an input by the occupant provided through an occupant input device 112, is then used by the controller 114 to determine whether the occupant is paying attention to the indication 150 on the first display 102. If the controller 114 determines that the occupant is not paying attention to the indication 150 based on the data received from the attention sensor 110, then at block 220 the SLAM based navigation system 101 relies upon at least one of its own logic, methods and algorithms to circumnavigate the suspected obstacle 154 without occupant intervention and the SLAM based navigation session 211 continues at block 222 until another suspected obstacle is identified at block 214.

If, based on the attention sensor 110 information received by the controller 114, the controller 114 determines the occupant is paying attention to the indication 150 displayed on the first display 102, then at block 224 the SLAM based navigation system 101 displays on a second display 104 augmented reality elements 152 placed relative to a drive path 136 that are related to the solicitation for intervention from the occupant provided at block 216. Again, while display 104 is configured in this embodiment as being a default display for augmented reality elements 152 and visualization, any of the displays 102, 104, 106 may be selected as the default display for providing augmented reality elements. The augmented reality elements 152 include, for example, a visualization of the kind of intervention the SLAM based navigation system 101 solicits from the occupant to facilitate whether to alter the vehicle path plan and at least one motion control instruction if the suspected obstacle 154 is confirmed to be present and pertinent to the vehicle path. In embodiments, the augmented reality elements 152 include ask the occupant to intervene and confirm that the SLAM based navigation system 101 correctly identified the suspected obstacle 154 blocking the drive path 136, and whether the suspected obstacle 154 is an actual obstacle pertinent to the vehicle path. The augmented reality elements 152 may include one or more of a superimposed highlight around the obstacle seen through the windshield 122 display, such as a bounding box superimposed on the display 102, and a flashing icon. In embodiments, additional information may be displayed on a third display 106 at block 226 that may be beneficial for the occupant to know, such as the degree to which the SLAM based navigation system 101 is familiar with the area and objects with detected feature points of high persistency, indications of some environmental attributes that assist either the SLAM based navigation system 101 in identifying issues, or assist making the SLAM based navigation session 211 more understandable to the occupant. Features of high persistency include, for example, pillars in a parking lot, gates, corners, and other static environmental features.

At block 228, the controller 114 measures a specified time interval during which the occupant may provide feedback and intervene in the SLAM based navigation session 211. In embodiments, a specified time interval is a given amount of time, such as, e.g., a few seconds to a few minutes, or a calculated amount of time based on the speed at which the vehicle 100 is approaching an obstacle and the environmental conditions, including how crowded the areas around a drive path are with obstacles, the width of the drive path, the weather conditions, etc. If at block 228, the occupant does not intervene during the specified time interval, then the SLAM based navigation system 101 relies upon its own logic, calculations, methods and/or algorithms to circumnavigate the suspected obstacle 154 and the SLAM based navigation session 211 continues at block 222 until another suspected obstacle is identified at block 214. At block 228, if the occupant does intervene during the specified time interval, for example by providing an input with an occupant input device 112, then the SLAM based navigation system 101 uses the occupant intervention to alter the SLAM based vehicle path and at least one motion control instruction at block 230 if the suspected obstacle is confirmed to be an obstacle in the drive path. At block 222, the SLAM session 211 continues until another suspected obstacle 154 is encountered at block 214.

Several advantages are offered by the simultaneous localization and mapping-based vehicle navigation systems described herein, including the enhancement of navigation through the use of occupant interactions when obstacles are identified. An additional advantage includes the ability to alter the degree of interaction that the occupant may have with the SLAM based navigation system. A further advantage includes presenting to the occupant only the information that the occupant is interested in seeing.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of soliciting an occupant intervention for a simultaneous localization and mapping-based navigation system, comprising:
   starting the simultaneous localization and mapping-based navigation system in a vehicle and initiating a simultaneous localization and mapping-based navigation session wherein the vehicle is driven either semi-autonomously or autonomously;
   creating a vehicle path plan and a motion control instruction based on maps using the simultaneous localization and mapping-based navigation system, wherein the simultaneous localization and mapping-based navigation system includes a controller;
   identifying with the simultaneous localization and mapping-based navigation system using information from a trip monitoring sensor a suspected obstacle in a drive path, wherein the drive path forms a portion of the vehicle path plan;
   providing an indication by the controller on a first display that an intervention by an occupant is requested;
   determining with the simultaneous localization and mapping-based navigation system using information from an attention sensor if the occupant is paying attention to the indication on the first display;
   directing the occupant's attention with an indication on the first display to a second display on a windshield including an augmented reality element placed relative to the obstacle seen through the windshield; and
   circumnavigating the obstacle with the vehicle using the simultaneous localization and mapping-based navigation system by using one of 1) logic in the simultaneous localization and mapping-based navigation system if the occupant does not intervene, and 2) input from the occupant to alter the vehicle path plan and the motion control instruction with the simultaneous localization and mapping-based navigation system.

2. The method of claim 1, further comprising circumnavigating the suspected obstacle in the drive path by using logic in the simultaneous localization and mapping-based navigation system without the intervention of the occupant upon determining the occupant is not paying attention to the indication on the first display.

3. The method of claim 1, wherein the augmented reality elements on the second display include a visualization of the kind of intervention the simultaneous localization and mapping-based navigation system solicits from the occupant.

4. The method of claim 3, further comprising: determining the occupant is paying attention to the indication on the first display; and requesting the occupant to provide an intervention on the first display.

5. The method of claim 4, further comprising: requesting the occupant to provide a confirmation the suspected obstacle on the second display is pertinent to the drive path.

6. The method of claim 5, further comprising: receiving the confirmation from the occupant by way of an occupant input device within a specified time period.

7. The method of claim 5, further comprising: circumnavigating the suspected obstacle in the drive path using logic in the simultaneous localization and mapping-based navigation system without the confirmation of the occupant when the confirmation of the occupant is not received within a specified period of time.

8. The method of claim 1, further comprising providing a notification to the occupant on the first display indicating the occupant may interact with the simultaneous localization and mapping-based vehicle navigation system; and receiving confirmation from the occupant through an occupant input device that the occupant has received the notification.

9. The method of claim 8, further comprising determining a predefined condition occurred before providing the notification with the controller.

10. A system for simultaneous localization and mapping-based navigation in a vehicle, comprising:
a controller;
a first display connected to the controller;
a trip monitoring sensor connected to the controller;
an occupant input device connected to the controller;
a second display connected to the controller, wherein the second display is on a windshield; and
an attention sensor connected to the controller;
wherein the controller is configured to execute instructions to:
start the simultaneous localization and mapping-based navigation system in the vehicle and initiate a simultaneous localization and mapping-based navigation session wherein the vehicle is driven either semi-autonomously or autonomously;
create a vehicle path plan and a motion control instruction using the simultaneous localization and mapping-based navigation system;
identify a suspected obstacle in a drive path with the trip monitoring sensor, wherein the drive path forms a portion of the vehicle path plan created by the simultaneous localization and mapping-based navigation system;
provide an indication on the first display that an intervention by an occupant is requested;
determine with the simultaneous localization and mapping-based navigation system if the occupant is paying attention to the indication on the first display using at least one of the attention sensor and the occupant input device;
direct the occupant's attention to the second display with an indication on the first display;
display an augmented reality element placed on the second display relative to the obstacle seen through the windshield; and
circumnavigate the obstacle with the vehicle with the simultaneous localization and mapping-based navigation system by using one of 1) logic in the simultaneous localization and mapping-based navigation system if the occupant does not intervene, and 2) input from the occupant to alter the vehicle path plan and the motion control with the instruction using the simultaneous localization and mapping-based navigation system.

11. The system of claim 10, wherein the controller is further configured to execute instructions to: display the augmented reality element on the second display upon determining the occupant is paying attention to the indication on the first display.

12. The system of claim 11, wherein the augmented reality elements includes a superimposed highlight around the suspected obstacle.

13. The system of claim 12, further comprising: a third display connected to the controller, wherein the controller is further configured to execute instructions to display information to assist the occupant in providing an intervention.

14. The system of claim 13, wherein the third display is integrated into an infotainment system.

15. The system of claim 14, wherein the intervention is provided with the occupant input device.

16. The system of claim 13, wherein the information includes at least one of: a degree to which the simultaneous localization and mapping-based navigation system is familiar with an area and objects with detected features of high persistency.

17. The system of claim 10, wherein the controller is further configured to execute instructions to request the occupant to provide an intervention that the suspected obstacle was correctly identified as an obstacle in the drive path, wherein the intervention is a confirmation.

18. The system of claim 17, wherein the controller is further configured to execute instructions to circumnavigate the suspected obstacle in the drive path without the confirmation of the occupant when the confirmation of the occupant is not received within a specified period of time.

19. The system of claim 10, wherein the first display is a heads-up display.

20. A system for simultaneous localization and mapping-based navigation in a vehicle, comprising:
a controller;
a first display connected to the controller;
a trip monitoring sensor connected to the controller;
an occupant input device connected to the controller;
an attention sensor connected to the controller;
a second display connected to the controller, wherein the second display is on a windshield; and
a remote system in communication with the controller,
wherein the controller is configured to execute instructions to:
start the simultaneous localization and mapping-based navigation system in the vehicle and initiate a simultaneous localization and mapping-based navigation session wherein the vehicle is driven either semi-autonomously or autonomously;
retrieve predefined maps from the remote system for creating a vehicle path plan and a motion control instruction using the simultaneous localization and mapping-based navigation system;
create the vehicle path plan and the motion control instruction using the simultaneous localization and mapping-based navigation system;
identify a suspected obstacle in a drive path with the trip monitoring sensor, wherein the drive path forms a portion of the vehicle path plan created by the simultaneous localization and mapping-based navigation system;
provide an indication on the first display that an intervention by an occupant is requested;
determine with the simultaneous localization and mapping-based navigation system if the occupant is paying attention to the indication on the first display using at least one of the attention sensor and the occupant input device;

direct the occupant's attention to the second display with an indication on the first display;

display an augmented reality element placed on the second display relative to the obstacle seen through the windshield; and circumnavigate the obstacle with the vehicle with the simultaneous localization and mapping-based navigation system by using one of 1) logic in the simultaneous localization and mapping-based navigation system if the occupant does not intervene, and 2) input from the occupant to alter the vehicle path plan and the motion control instruction with the simultaneous localization and mapping-based navigation system.

* * * * *